Figure 1:
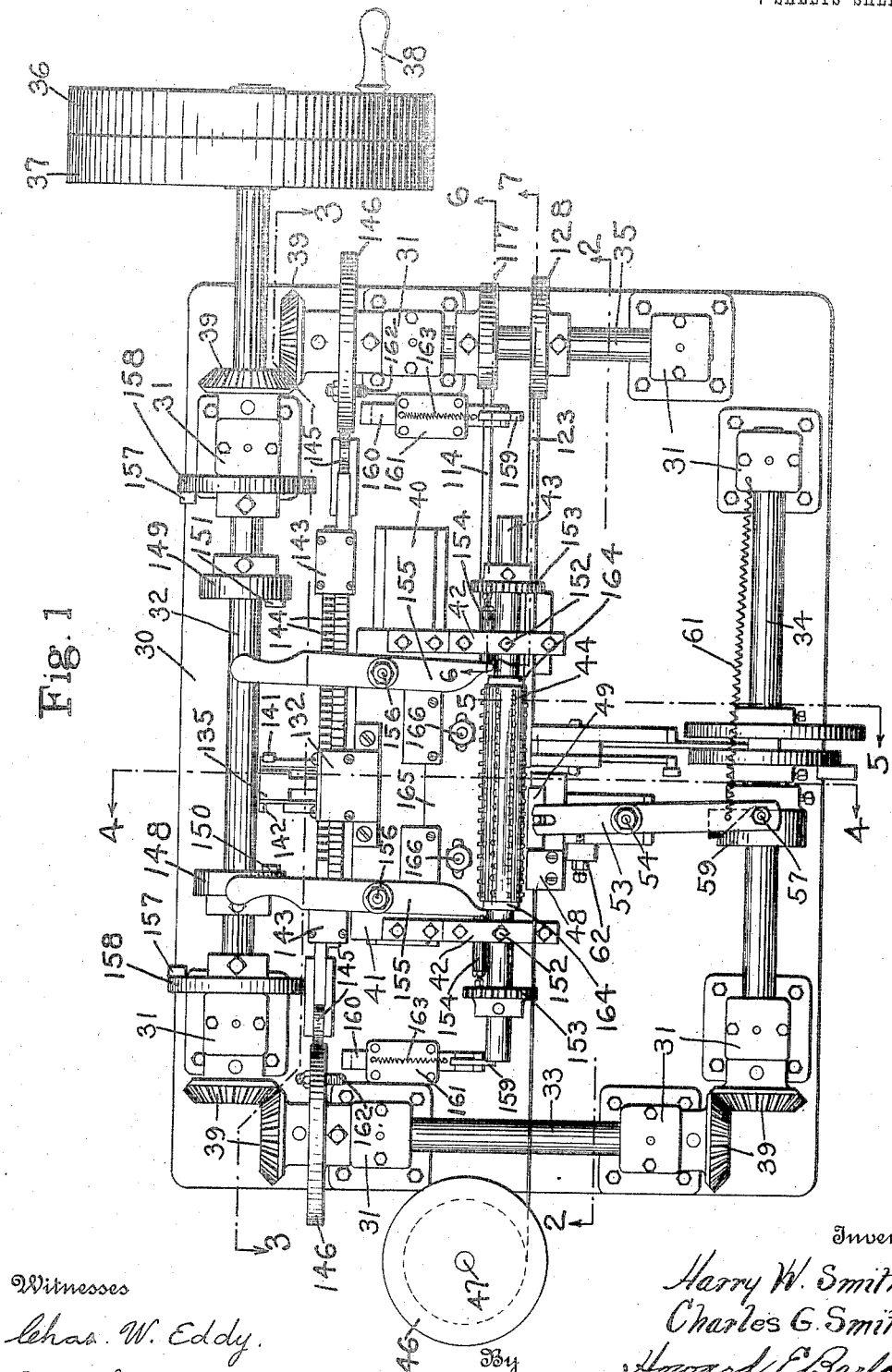

H. W. & C. G. SMITH.
LINK MESH MACHINE.
APPLICATION FILED MAY 13, 1911.

1,078,317.

Patented Nov. 11, 1913.
7 SHEETS—SHEET 1.

Witnesses
Chas. W. Eddy.
E. I. Ogden

Inventors
Harry W. Smith
Charles G. Smith
Howard E. Barlow
By
Attorney

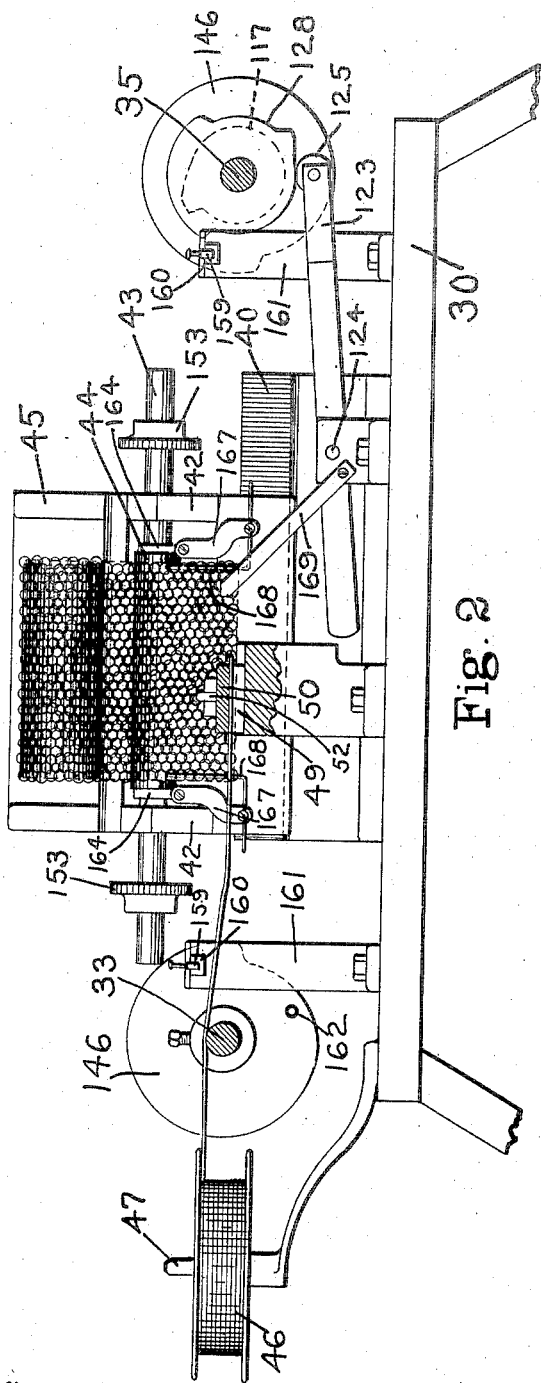
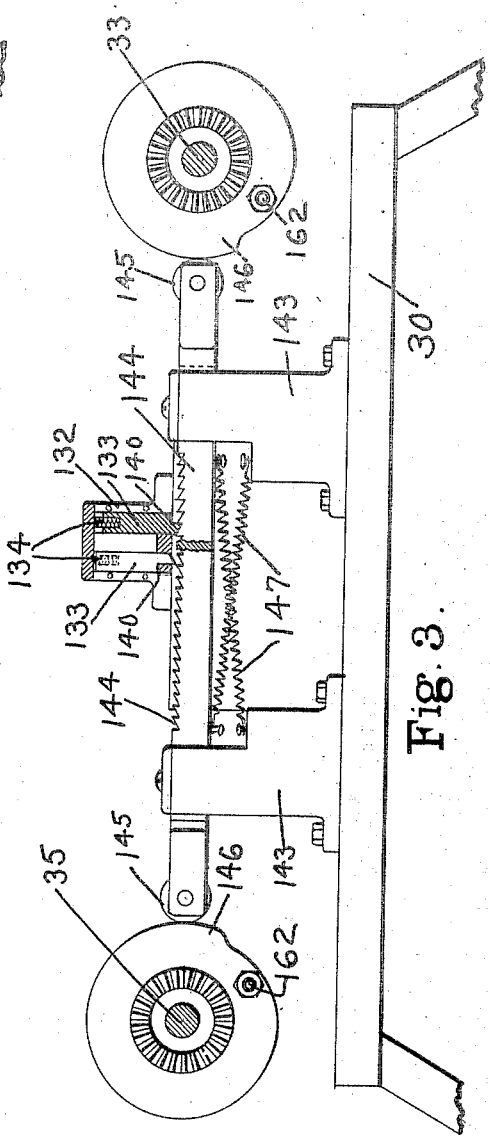

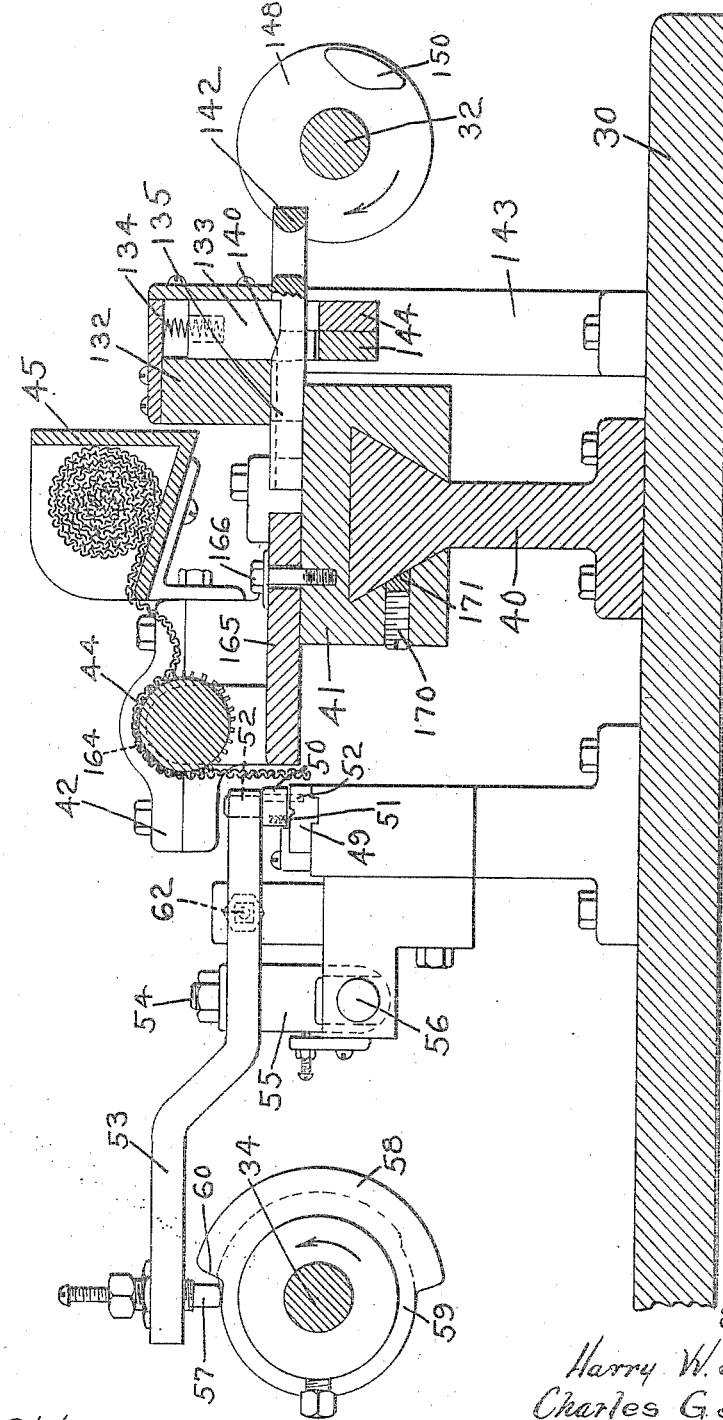

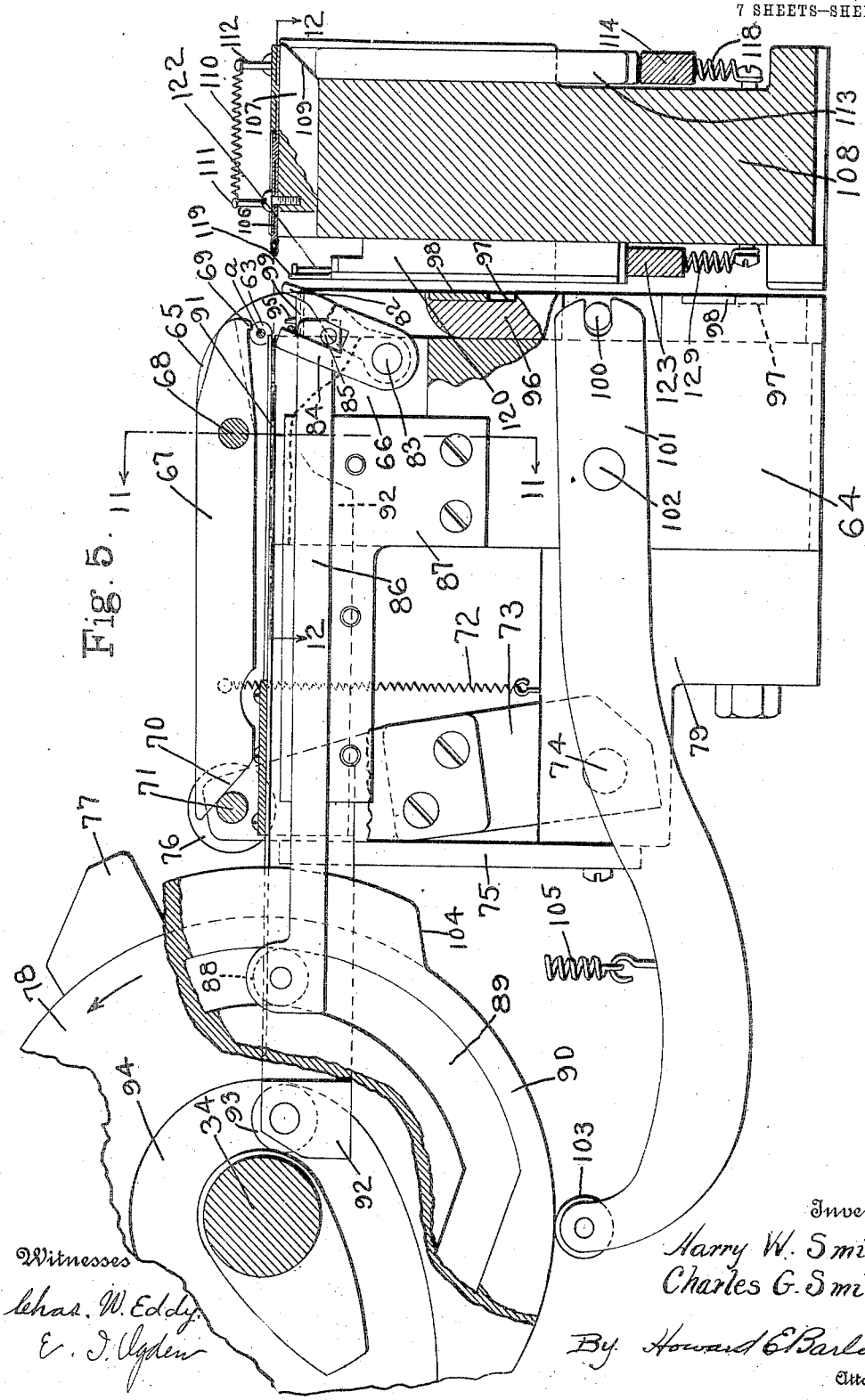

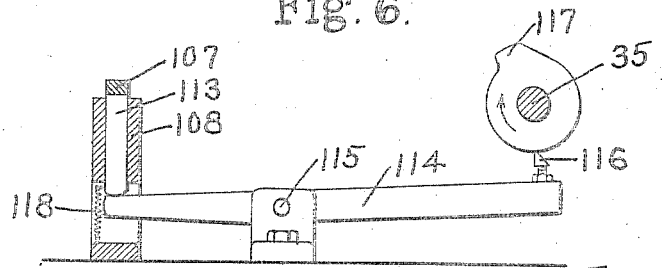
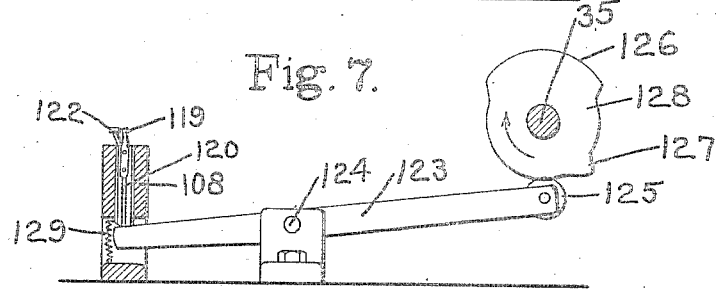
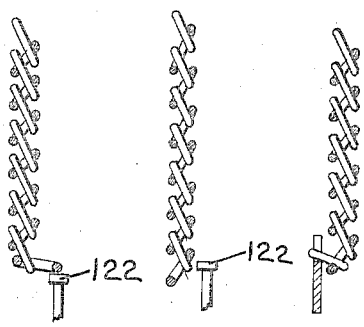
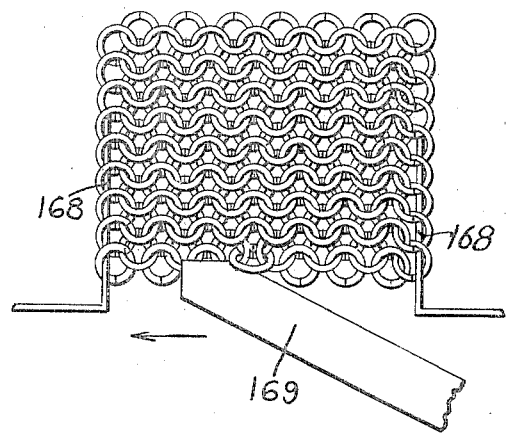
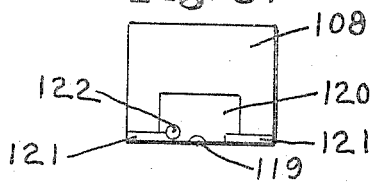

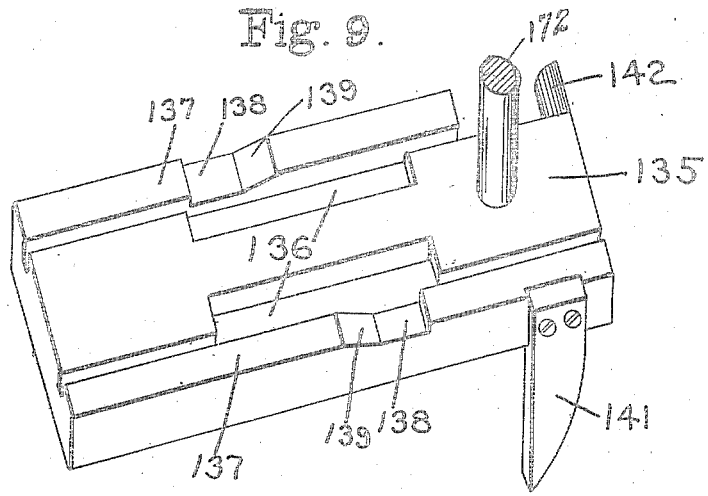
Fig. 9.
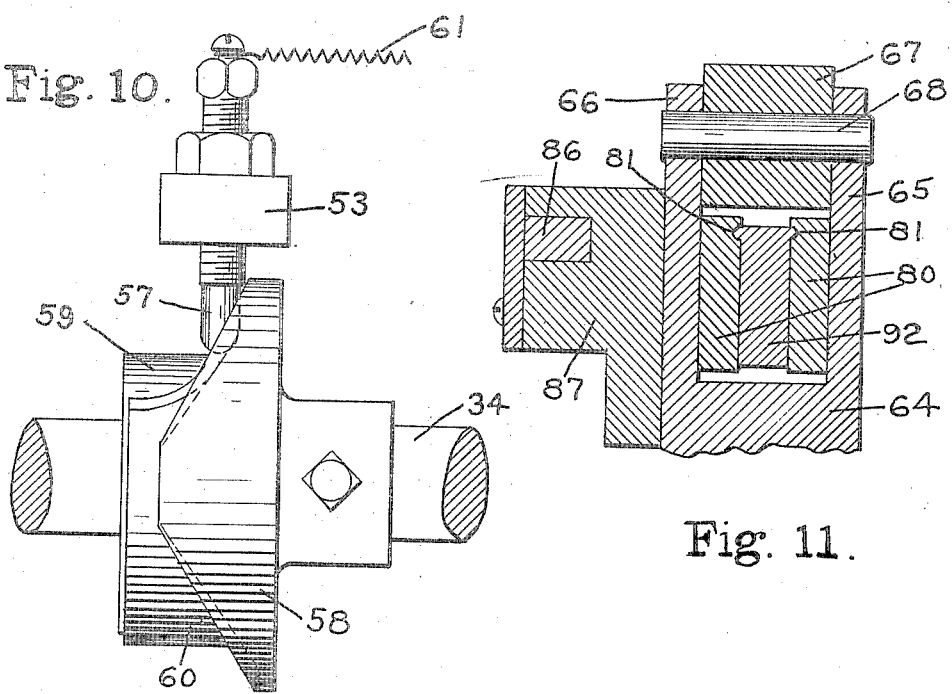
Fig. 10.
Fig. 11.

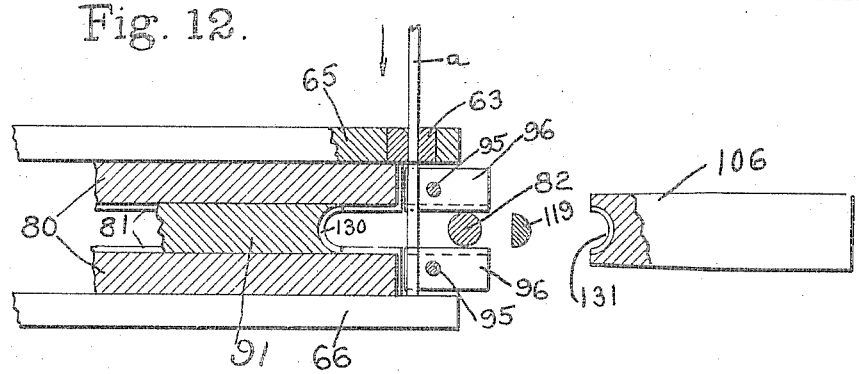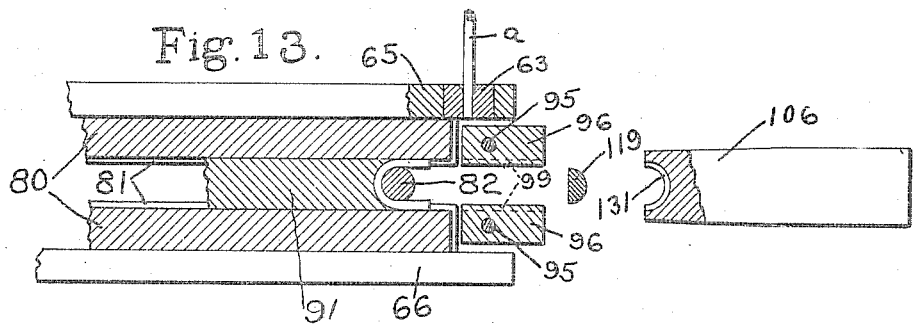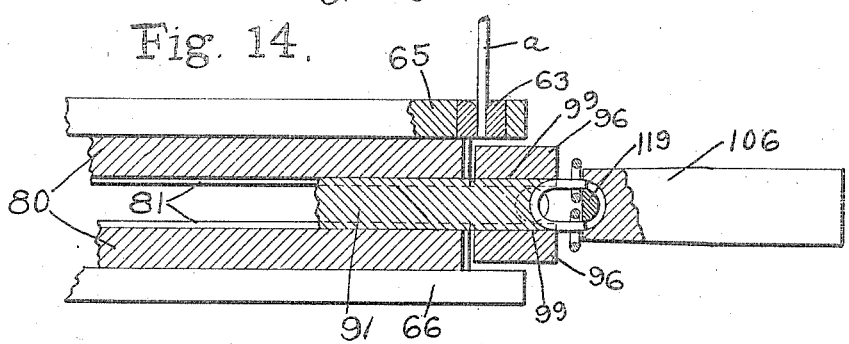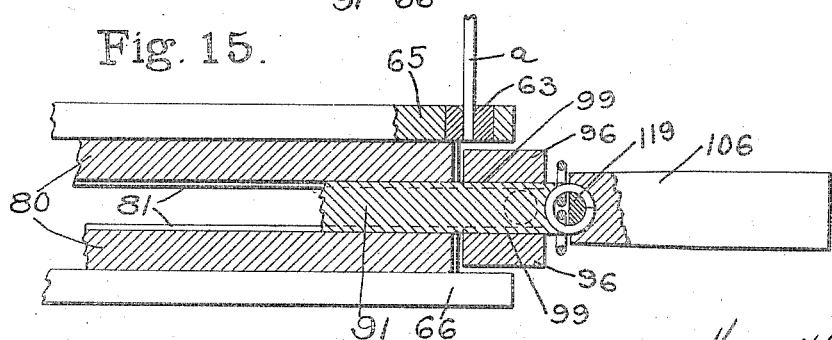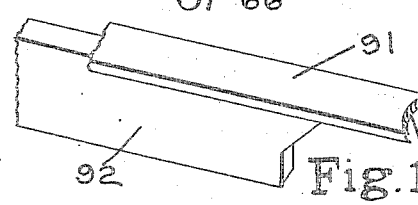

UNITED STATES PATENT OFFICE.

HARRY W. SMITH AND CHARLES G. SMITH, OF PAWTUCKET, RHODE ISLAND, ASSIGNORS TO NICKERSON ART METAL COMPANY, OF PAWTUCKET, RHODE ISLAND, A CORPORATION OF RHODE ISLAND.

LINK-MESH MACHINE.

1,078,317.   Specification of Letters Patent.   Patented Nov. 11, 1913.

Application filed May 13, 1911. Serial No. 626,954.

*To all whom it may concern:*

Be it known that we, HARRY W. SMITH and CHARLES G. SMITH, citizens of the United States, residing at the city of Pawtucket, in the county of Providence and State of Rhode Island, have invented certain new and useful Improvements in Link-Mesh Machines, of which the following is a specification, reference being had therein to the accompanying drawing.

This invention relates to machines for automatically making wire fabric of the type usually known as "ring mesh" and consisting of a multiplicity of links each of which is interengaged with a plurality of other links.

One of the objects of the present invention is to provide a machine of this character which will enable the fabric to be produced in flat or sheet form having all of its transverse rows of links at a right angle to the length of the sheet or strip of fabric.

Another object of the invention is to provide such a machine capable of producing the fabric in different widths.

Another object is to provide such a machine which not only automatically performs its function but may be operated by hand to locally form and connect either one or a greater number of links for either making repairs or filling in spaces if such should be left due to the failure of any part of the machine or defects in the wire employed.

With these and other objects in view, the invention consists of certain novel features of construction, as will be more fully described and particularly pointed out in the appended claims.

In the accompanying drawings: Figure 1 is a plan view of the machine omitting the upper support for the roll of completed work and omitting some of the smaller details of construction. Fig. 2 represents a section chiefly on line 2—2 of Fig. 1. Fig. 3 represents a section chiefly on the line 3—3 of Fig. 1. Fig. 4 represents a section on line 4—4 of Fig. 1 on a larger scale. Fig. 5 represents a section on line 5—5 of Fig. 1, on a larger scale, parts being omitted and other parts being broken out. Fig. 6 represents a detail section on line 6—6 of Fig. 1. Fig. 7 represents a detail section on line 7—7 of Fig. 1. Fig. 8 is a detail plan of the mechanism at left of Fig. 7. Fig. 9 is a perspective view of the slide for controlling the pawls of the carriage feed. Fig. 10 is a detail front elevation of the wire-feed cam. Fig. 11 represents a section on line 11—11 of Fig. 5. Fig. 12 represents a detail section on line 12—12 of Fig. 5. Figs. 13, 14, and 15 are views similar to Fig. 12 but illustrating the parts in different positions which they occupy during the operation of the machine. Fig. 16 is a perspective view of the pusher on the front former. Figs. 17, 18, and 19 represent vertical sections through a portion of the fabric being made, and illustrating the operation of the link tipping devices. Fig. 20 is an elevation from the left of Fig. 19.

Similar reference characters indicate the same or similar parts in all of the views.

The main bed or table 30 of the machine is provided with suitable standards having journaled bearings 31 for four shafts 32, 33, 34 and 35. The shaft 32 is provided with fast and loose pulleys 36, 37 the fast pulley having a crank or handle 38 to enable the machine to be operated by hand. The four shafts are geared together by bevel pinions 39 so that all rotate in unison. The bed 30 also supports a slide 40 on which is mounted the carriage base 41 having brackets 42 for the shaft 43 of the work feeding pin roll 44. Said roll may be an integral portion of the shaft, or a sleeve rigidly secured thereto. The pins are all spaced to engage links of the fabric as clearly illustrated in Fig. 4. Suitably supported above and somewhat to the rear of the pin roll is a box 45 in which the roll of completed fabric may be carried. This box is merely a convenience and may be replaced by any other suitable mechanism or device for receiving the work after it leaves the pin-roll. With such a box 45 in use, the operator simply occasionally takes up the slack of the fabric behind the roll 44 by revolving the roll of fabric in the box to wind up the fabric.

In Figs. 1 and 2, a reel 46 for the wire *a* that is employed to make the links, is suitably supported as by a spindle 47. From said reel the wire is passed between upper and lower plates of a friction block 48 (Fig. 1) and is then passed to the feed device which comprises a slide 49 (see Fig. 4)

mounted in suitable ways so that it can be reciprocated toward and from the friction block, the upper member of the feed device comprising a presser 50. Springs 51 mounted in recesses of the said slide and presser tend to normally separate them so as to release the wire which lies in grooves formed in the opposing faces of said slide and presser. Of course the slide and presser are so connected that they can have no relative lateral movement. A pin 52 rising from the presser is engaged by the slotted or forked end of a lever 53 pivoted at 54 to the upper end of a rocking post 55, said post being pivotally connected at 56 to a fixed support. This mounting of the lever 53 is such that the end thereof which actuates the feed device is moved in a four-motion path by cams acting upon a stud 57 at the outer end of said lever. Referring to Figs. 4 and 10, it will be seen that a cam 58 carried by a hub 59 secured to shaft 34 is adapted to act upon the side of stud 57 so as to oscillate the lever 53 on its pivot 54, a spring 61 being employed to actuate said lever in the opposite direction. The hub 59 has also a peripheral cam 60 which acts upon the tip or lower end of the stud 57 so as to oscillate the lever 53 and its supporting post 54 on the axis of pivot 56. The two cams 58 and 60, as will now be understood, actuate the lever 53 so that its forked or slotted end will have four-motions imparted to it so as to first force the presser 50 downward to clamp the wire, then shift said presser and the said slide 49 laterally to feed the wire, the presser being then released and the lever returning for the next feed operation. By providing an adjustable stop 62 at one side of lever 53, as indicated in Fig. 1, the length of feed of the wire may be varied.

From the feed device the wire passes through a bushing 63, see Figs. 5 and 12 to 15 inclusive, said bushing being supported in one of the walls 65 of a block 64 rigidly supported on the bed of the machine. Said block is recessed in its upper portion as best shown in Fig. 11 so as to form two walls 65 and 66, a portion of the latter serving as an abutment against which the end of the wire that is fed may be pushed by the feed device. A cutter lever 67 is pivoted as at 68 and has a small lug or shoulder 69 projecting downwardly at its tip end so that when said cutter lever is oscillated in a direction to sever the wire close to the inner end of bushing 63, the said lug 69 will prevent the wire from being snapped away from under the cutter lever. The rear end of the lever 67 is beveled as at 70 (see Fig. 5) said beveled end being engaged by a pin 71 which is actuated in one direction to raise the longer end of the lever 67, a spring 72 being employed to return said lever. The pin 71 is carried by a lever 73 which is pivoted at 74 to an angle block 79 that is secured to block 64. Also secured to said angle block is a stop finger 75 to limit the outward motion of the lever 73 under the influence of the spring 72 causing the beveled end 70 of the lever to bear on pin 71. The lever 73 also carries at its upper end a roll 76 which is engaged so as to cause the lever 73 to actuate the cutter lever 67, by a cam projection 77 carried by a disk 78 on a shaft 34. The shaft 34 is revolved in a direction to carry the disk 78 in the direction of the arrow shown in Fig. 5.

Rigidly secured to, or integral with the wall members 65, 66 of the block 64 are two cheek pieces 80 having grooves 81 opposite each other as shown in Fig. 12. After the length of wire has been cut off and occupies the position shown in Fig. 12, the severed piece is bent into U-form and carried into the outer ends of the grooves 81, by a bending pin 82 which constitutes the outer end of an arm rigidly secured to a rock shaft 83 (see Fig. 5). Said rock shaft has also secured to it a bifurcated arm 84, the slot or recess of said arm being engaged by a pin 85 of a slide 86 mounted in ways formed in a block 87, said block being secured to the block 64. The other end of the slide 86 carries a roll 88 which engages a cam groove 89 formed in one side of a disk 90 that is secured to shaft 34 so that as said shaft rotates, the bending pin 82 may be carried from the position indicated in Fig. 12, to the position indicated in Fig. 13, and return. When the parts are in the position shown in Fig. 13, the curved portion of the wire is carried into a groove 130 in the end of the pusher or front former 91 which is rigidly secured to or integral with a slide 92 mounted to reciprocate in a suitable guide that is formed in one of the fixed blocks, the outer end of said slide 92 having a roll 93 which engages a cam groove 94 in the disk 78 carried by shaft 34.

When the wire is pushed by the feed device through the bushing 63, and is cut off, the severed length is carried down behind two pins 95 which rise from the upper faces of a bifurcated slide 96 (see Figs. 5 and 12). When the wire is first cut off the slide 96 is in its lower position, which lower position is somewhat exaggerated in Fig. 5, and then the said slide 96 is elevated to carry the wire to the horizontal plane of the grooves 81 of the cheek pieces 80. Said slide 96 is mounted in a suitable guide way that is in the block 64 and said slide is cut out as at 97 to receive cross pieces 98 that are secured to said block 64. The inner faces of the two arms or members of the slide 96, near their upper ends or tops, are provided with opposing grooves 99 which are adapted to register with the grooves 81 when the slide 96 is in its uppermost position, the purpose of said grooves being presently explained.

The slide 96 is provided with a lateral pin 100 which is engaged by the slotted or forked end of a lever 101 pivotally supported at 102 and having a roll 103 which is engaged by a cam 104 projecting from the disk 90. A spring 105 is suitably connected to the lever 101 and to some fixed point to return the lever to normal position after it has been actuated by cam 104.

After the cut piece of wire has been carried to the position shown in Fig. 13, the timing of the parts of the machine is such that the bending pin 82 next swings outwardly to a position so that its upper end is below the horizontal plane of the grooves 81, this outer and lower position of the pin 82 being best indicated in Fig. 5. The slide 92 is then actuated so that the pusher or front former 91 acts upon the U-shaped piece of wire to slide it along and out of the grooves 81 and into the grooves 99 in the inner faces of the two arms of the vertical slide 96, the U-shaped piece of wire being thus transferred to the position shown in Fig. 14, the two legs of the U passing through adjacent rings or links and reaching the ends of a curved horizontal groove 131 formed in the front end of a back former 106 which, at this time, has been advanced from the position shown in Figs. 12 and 13 to the position shown in Fig. 14. This back former 106 is carried by a slide 107 (see Fig. 5) mounted in a guide way therefor in the upper end of a rigidly mounted standard or post 108. The rear end of the slide 107 is beveled as at 109, and said slide 107 is normally held in the position shown in Fig. 5 by a spring 110, one end of which is connected to a pin 111 carried by slide 107, the other end being connected to a standard pin 112. A vertical slide 113 mounted in a guide way in the post 108 actuates the slide 107 by sliding contact with the bevel end 109 of the latter. The slide 113 is actuated by a lever 114 (see Figs. 1, 5 and 6) said lever being pivoted at 115 to a suitable fulcrum bracket, the outer end of said lever carrying an adjustable adjustment 116 in the path of a cam 117 secured to shaft 35. The point to which the slide 107 and the back former 106 may be advanced, is controlled by adjusting the height of the abutment 116. A spring 118 is connected at one end to the vertical slide 113 and at its lower end to a suitable fixed point, said spring serving to return the lever 114 after it has been actuated by the cam 117.

During the movement of the parts from the position indicated in Fig. 13 to that indicated in Fig. 15, the opposite ends of the front former 91 and back former 106 are brought nearly together, the space between said ends when in closest proximity being sufficient to accommodate the previously formed links of the fabric. The positions of the tips of the formers when almost meeting is such as to impart little or no disturbance to the web of fabric hanging from the pin roll 44. As the parts move from the positions indicated in Fig. 14 to those indicated in Fig. 15, the ends or legs of the U-shaped piece of wire would protrude from the former 91 into the ends of a groove 131 formed in the end of the back former 106, said groove being curved so as to bring the link into ring form as clearly indicated in Fig. 15. Preferably a center former 119 is employed to occupy the space between the front end of the back former 106 and the rear surface of the adjacent previously formed rings of the fabric, said center former having a curved rear face that is concentric with the grooved recess in the end of the back former 106 and a flat front face which serves as a bearing or abutment for that portion of the web to which links are being added and especially to the two links through which the U-shaped piece of wire is being inserted. This device causes the two ends of the wire to meet accurately, thereby preventing any liability of mal-formation of a ring or link. Said center former 119 is shown as a pin rising from the upper end of a vertical slide 120, (see Figs. 5, 7 and 8). The slide 120 is mounted in a guide way formed in the post 108, and is retained therein by face strips 121. The pin 119 is preferably constructed as separate from the slide 120 and secured thereto by rivets or screws. Said slide carries also a tipping pin 122 which is offset laterally from the tip of pin 119, and the purpose of said pin 122 will be hereinafter described.

The slide 120 is raised by a lever 123 (see Fig. 7) which is pivotally supported at 124 and has a roll 125 adapted to be actuated alternately by cams 126 and 127 carried by a disk 128 secured to shaft 35. A spring 129 is connected at one end to the slide 120 and at the other end to a suitable fixed point to lower said slide after it has been raised by the lever 123.

The cam 126 is of such length as to hold the slide 120 raised during the entire time that the ring or link is being formed around the back of the center former pin 119. The timing of the machine is such that after the work has been fed along as presently described, the cam 127 gives a very short or quick action to the lever 123 so as to raise the slide 120 and cause the upper surface of the tipping pin 122 to tilt over to proper position the ring or link that has just been made if the withdrawal of the forming tools has resulted in leaving the link tipped in the wrong direction as indicated in Fig. 17. This is liable to occur sometimes and if the ring or link just formed has been left in the position indicated in Fig. 17, the operation of the pin 122, as it rises, will so tilt that ring or link that it will slide over to the correct position shown in Fig. 18. As shown in Fig. 8, the tipping pin 122 is spaced far enough from the center former pin 119 to not be in the way of the forming tools when the latter are performing the operations illustrated in Figs. 12 to 15 inclusive.

The mechanism for shifting the carriage along step by step, so that the successively formed rings or links will be interengaged with previous ones as shown in Fig. 20, will now be described.

Referring to Figs. 1, 3, 4 and 9, it will be seen that there is a box or casing 132 secured to the carriage base 41, said casing 132 containing two vertical movable pawls 133 which are normally pressed downwardly by springs 134. Underneath the casing 132 is a pawl-controlling slide 135 having slots 136 through which said pawls are adapted to act as presently described. The slide 135 is formed with ribs 137 which are recessed at 138, one side of each recess 138 being inclined to form a cam 139. The pawls 133 are provided with shoulders 140 adapted to contact with the ribs 137. As will be readily understood, when a pawl has its shoulder on the higher portion of the rib 137 that pawl will be elevated. The two recesses 138 are at such relative distances from the end of the slide 135 that when one pawl 133 has its shoulder in a recess 138, and so is permitted to be depressed by its spring 134, the other pawl is held in an inoperative position because of its shoulder resting on the higher portion of its rib 137. By simply shifting the slide 135 in the direction of its length, one pawl will be permitted to act and the other will be raised by a cam 139 riding under the shoulder of the pawl that is to be put out of action. Preferably the slide 135 is provided with a handle to enable it to be conveniently shifted manually for a purpose hereinafter described. Such a handle is indicated at 172 in Fig. 9, partly broken away.

In the automatic operation of the machine the slide 135 is shifted automatically by the engagement of cam devices with one or the other of two lugs 141–142, carried by the slide.

Mounted in standards 143 rising from the bed 30 are two bars having ratchet teeth which face in opposite directions, that is the teeth of one bar face in one direction and the teeth of the other bar face in the opposite direction. Each ratchet bar 144 has a roll 145 at one end which is adapted to be acted upon by a cam 146, one cam being on the shaft 33 and the other cam being on the shaft 35. Springs 147 effect return motions of the ratchet bars. As these shafts and cams rotate, the ratchet bars are reciprocated simultaneously in opposite directions, but since only one pawl 133 can be in lower or operative position at a time, the pawl casing 132 and the work carriage to which it is attached, will be fed intermittently in one direction until something occurs to shift the pawls so that the one that has been lowered will be raised and the other one will be lowered. As has been mentioned this might be done by hand; but to effect an automatic shifting of the pawl control slide the shaft 32 is provided with two disks 148, 149, (see Fig. 1,) the disk 148 having a cam lug 150, and the disk 149 having a cam lug 151. One of these cam lugs is so carried by its disk as to contact with the outer face of the lug 141 so as to push the slide inwardly, the cam lug of the other disk on the shaft 32 being so positioned as to contact with the inner surface of the lug 142 to pull the slide outwardly so as to reverse the operation of the carriage feed pawls. As shown in Fig. 1, the disks 148, 149 are so spaced on the shaft 32 that their cam lugs can only perform the operations just described at the ends of the travel of the carriage 41 on the slide 40. It is to be understood that the teeth of the ratchet bars are of such width as to effect, by the mechanism just described, an intermittent feed of the carriage a distance substantially equal to the diameter of each ring or link being formed. Of course when a reverse of the drive of the carriage occurs, the pin roll must be given a slight partial rotation to raise the row of links that have just been completed a distance substantially equal to one-half the diameter of the rings or links. To prevent overthrow of the pin roll during its movement to feed the web of fabric upwardly a suitable brake or friction device should be employed. In Fig. 1 we have illustrated screws 152 so mounted in the brackets 42 that their lower ends may contact with the shaft 43 or with friction blocks set in the bottoms of the screw holes.

The means for imparting the intermittent feed rotation to the shaft 43 and its pin roll 44 will now be described.

Secured to the shaft 43 are two disks having ratchet toothed peripheries 153. Mounted to reciprocate slightly in each of the brackets 42 is a push pin 154 preferably having an adjustable outer end; in other words, the pins 154 may be varied in length as by a screw and lock nut carried by the outer end. It is to be understood at this point that the shaft 43 is capable of having imparted thereto a slight movement in the direction of axis of said shaft, for a purpose hereinafter described. Such endwise movement of the shaft 43 is executed by levers 155 pivoted at 156 and having their outer ends in position to act upon one or the other of the push pins 154 so that the outer end of such push pin will act against the inner face of the disk having ratchet teeth 153 to shift the shaft 43 and the pin roll 44 slightly. The levers 155 are actuated by cam lugs 157 carried by disks 158 secured to shaft 32. These cam disks 158 are so spaced relatively to each other that one or the other will act upon a lever 155 to oscillate the lever on its pivot 156 at the end of the reciprocation of the work carriage in a manner that will be more fully described presently.

To cause the intermittent step rotation of the shaft 43 and the pin roll 44 two pawls 159 are carried by slides 160 which are mounted in bearings 161, see Figs. 1 and 2. The rear ends of the slides are beveled as indicated by the dotted lines in Fig. 1, said beveled rear ends being located so that lugs 162 carried by the cam disks 146 may act upon the slides 160 to move them in one direction, the return direction being obtained by means of springs 163. The lugs 162 may be, as indicated, simply hardened steel screws secured in position by check nuts. Since the disks 146 are constantly revolving, each rotation will cause both slides 160 to be reciprocated. Consequently the two pawls 159 are reciprocated once for each rotation of the shafts. But such reciprocations of the two pawls effect nothing until one or the other of the ratchets 153 reaches a position to be engaged by a pawl 159. As the work carriage travels along and the links are being formed and interengaged in the manner described, said carriage finally reaches a position where its direction of travel is to be reversed. The timing of the operation of the different parts of the machine is such that after the completion of a link at one end of a row the pin roll is actuated so as to shift the web of fabric a distance equal to one-half the link diameter before another link is formed, and also before another link is formed a lever 155 is actuated so as to shift the shaft 43 and pin roll 44 lengthwise a distance equal to one-half a link diameter, in a manner that would be readily understood by means of Fig. 20 of the drawing. At each end of the pin roll 44, as shown in Fig. 1, the shaft 43 is encircled by a collar 164 rising from a plate 165 that is mounted on the carriage base 41 as best shown in Fig. 4. The plate 165 is formed with transverse slots through which screws 166 pass into said base 41. The screws 166 do not bind the plate 165 in place but permit said plate to slide when the pin roll is shifted in one direction or the other by the cams which act upon the levers 155. To the front portions of the collars 164 (see Fig. 2) are secured strips 167 which in turn adjustably support light wire uprights 168 (see Fig. 20). Said uprights 168 constitute guides which are free at their upper ends. Said uprights or guides serve to hold the marginal rings or links as they are formed and after they are formed long enough to keep them in position for the interlocking of the next rings or links. By reference to Fig. 20 it will be readily understood that if the guides or uprights 168 were omitted the ring or link at each end of the lower row would swing around and not be in position to be interengaged by the next ring or link formed. These guides being free at their upper ends, however, present no obstacle to the fabric being carried up by the pin roll.

It will be observed that the edge of the fabric to which links or rings are successively being added is unsupported, hanging free from the roll 44. The machine here presented has been so devised that a flat web of link mesh fabric hangs vertically suspended from the said pin roll, and this we believe to be the most desirable mechanical arrangement, though the parts would operate should the machine be inclined, or the parts disposed so that the portion of the web between its free edge and the pin roller is approximately horizontal instead of vertical. In such latter arrangement there would have to be provision made for maintaining the part of the web adjacent to its free edge in a substantially flat condition, and such means are provided by the guides 168.

In Fig. 20 a link is shown as not being dropped to proper position. This is liable to occur with the links of alternate rows. It may be stated here, that the links slanting in one direction seldom fail to fall to proper position, but links of the alternating rows are liable to occupy the wrong inclination after they are left by the forming tools. In Fig. 20 it is to be supposed that the web of fabric is traveling in the direction of the arrow, and therefore it moves in such direction that the upper edge of an inclined strip 169 (see Fig. 2) will be presented in such position that an improperly tilted link will ride along on and be guided upwardly by the strip 169 so that as it passes over the tip of said strip it will fall to the position represented by the other links of the lower row. When the web is traveling in the direction opposite that indicated by the arrow in Fig. 20 the row of links then being formed is the row the links of which naturally assume proper positions of inclination. As shown in Fig. 4, the carriage base 41 may be provided with a screw 170, and a block or piece of friction material 171 inserted between the inner end of said screw and the side face of the slide 40, so as to cause sufficient friction to prevent any possibility of retrograde motion of the carriage after it has been advanced each step by the ratchet bar and pawl mechanism hereinbefore described.

The machine operates chiefly automatically as has been described, the link forming tools performing their functions in proper order, the wire being fed, the carriage being reversed at the proper times, and the feed of the web executed. If the operator running the machine notices at any time that a link has been omitted from the lower row, the machine can be instantly stopped by throwing off the power and then the carriage can be shifted to the exact position needed by manipulation of the pawl control slide and then sliding the carriage along to the proper point. Then a single operation of the machine by means of the crank handle 38 will supply a complete ring in the place needed, after which the carriage can be returned to the position where it stopped, and automatic operation resumed.

The machine is capable of making various widths of mesh fabric, since it is in flat form. To enable this to be done, as well as to enable the parts to be set for accurate operation, it is necessary to adjust the cam disks 148, 149, and cam disks 158 along the shaft 32; also the ratchets 153 on the shaft 43. When the latter are adjusted lengthwise, the push pins 154 are lengthened out or shortened, as the case may be, in the manner hereinbefore described.

We claim:

1. In a machine of the character described, a support for a substantially flat web of link mesh fabric, means for feeding and cutting the wire and subsequently forming links of the cut portions and connecting them to meshes of the fabric, and means for automatically shifting the web relatively to the point of formation of the links.

2. In a machine of the character described, a support for a substantially flat vertically disposed web of link mesh fabric, means for forming independent links and connecting them to the lower edge of the fabric, means for causing relative movement of the forming means and the fabric support, and means for reversing the direction of relative movement.

3. In a machine of the character described, link forming tools, a carrier for a flat vertically disposed web of link mesh fabric movable transversely of the link forming tools, means for moving said carrier step by step a distance equal to the diameter of the links, and means for actuating the carrier at the end of a row of links a distance equal to one-half of the diameter of a link.

4. In a machine of the character described, a support for a flat web of link mesh fabric, means for successively connecting links to the edge of the fabric, means for causing relative movement of the said support and link-applying means step by step a distance equal to the diameter of a link, and means for causing a relative movement of said parts a distance equal to half the diameter of a link, the last-mentioned means being arranged to operate after the last link of each row has been applied.

5. In a machine of the character described, a support for a web of link mesh fabric mounted so as to be free to be moved to a limited extent transversely of the fabric, means for successively connecting links to the edge of the fabric, means for causing relative movement of the said support and link-applying means step by step a distance equal to the diameter of a link, means for moving the support transversely of the fabric a distance equal to half the diameter of a link after the last link of each row has been applied, and means for moving the support to advance the fabric in the direction of its length after each row of links has been applied.

6. In a machine of the character described, link forming tools, a carrier for a flat vertically disposed web of link mesh fabric movable transversely of the link forming tools, means for moving said carrier step by step a distance equal to the diameter of the links, means for actuating the carrier at the end of a row of links a lateral distance equal to one-half the diameter of a link, and means for shifting the web a distance equal to one-half the diameter of a link in the direction of the length of the web.

7. In a machine of the character described, a support for a substantially flat vertically disposed web of link mesh fabric, means for forming links and connecting them to the lower edge of the fabric, and means for reversing the direction of progress of the work.

8. In a machine for forming ring or link-mesh fabric, the combination of means for supporting a flat web of the fabric, and from which a free end of the fabric extends, means for connecting links to the free edge of the fabric, and means for causing relative movement of the link-applying means and fabric-supporting means to cause the links to be successively added and the fabric produced.

9. In a machine for forming link or ring mesh fabric, the combination of a support for a flat web of link mesh fabric, from which a free end of the fabric extends, means for forming links and connecting them to the free edge of the fabric that extends from the support, and means for causing relative movement of the link-forming means and fabric support to cause the links to be successively added and the fabric produced.

10. In a machine for forming link mesh fabric, the combination of a support for a flat web of fabric from which a free end thereof extends, guides with which the marginal portions of the free end of the fabric engage, means for applying links to the free edge of the fabric, and means for moving the support to take up the fabric as formed.

11. In a machine for forming link mesh fabric, the combination of a support for a flat web of the fabric from which a free end thereof extends, guides with which the marginal portions of the free end of the fabric engage, and means for forming links and applying them to the free edge of the fabric, the said link forming and applying means being arranged to cause the marginal links of the fabric to embrace said guides.

12. In a machine of the character described, a support for a substantially flat vertically disposed web of link mesh fabric, means for forming links having abutting ends and connecting them to the fabric, and means for reversing the direction of progress of the work, said machine having adjustable parts to vary the width of the web.

13. In a machine of the character described, the combination of a support for a substantially flat web of link mesh fabric, means for applying links to the edge of the fabric being formed, means for causing relative transverse movement between the link-applying and fabric-supporting means whereby the links are successively applied in rows, and means for reversing the direction of movement, the said reversing mechanism being adjustable, whereby the width of the web of fabric produced may be varied.

14. In a machine of the character described, the combination of a support for a substantially flat web of link mesh fabric, means for forming links and connecting them to the fabric, means for causing a step by step transverse relative movement between the fabric support and the link-forming and applying means, means for reversing the direction of said movements after the link at the end of each row has been formed, the said reversing means being adjustable to vary the width of the fabric, and means for moving the support to advance the fabric as rows of links are added thereto.

15. In a machine of the character described, a support for a substantially flat vertically disposed web of link mesh fabric, link forming tools, and means for actuating said support to shift the fabric in a zig-zag path during the progress of the work.

16. In a machine of the character described, a support for a substantially flat vertically disposed web of link mesh fabric, forming tools, means for automatically shifting the support to control the progress of the work, and means whereby the fabric carrying mechanism may be shifted manually to enable a link to be formed and applied in a selected portion of the fabric.

17. In a machine of the character described, the combination of a support for link mesh fabric, means for applying links to the edge thereof, means for automatically causing relative movement between the said support and link-applying means to control the progress of the work, and means for throwing the said automatic means out of operation, whereby the parts are left free to be moved by hand to permit a single link to be applied in any selected portion of the fabric.

18. In a machine of the character described, a support for link mesh fabric, freely movable in the direction of the length of the fabric and transversely thereto, means for applying links to the edge of the fabric, means for automatically moving the said fabric support and the link applying means relative to each other to control the progress of the work, and means for throwing the said automatic means out of operation leaving the parts free to be moved by hand to shift the fabric laterally and longitudinally with reference to the link-applying means, whereby the fabric may be adjusted by hand and a link applied to any selected portion of the fabric.

19. In a machine of the character described, the combination of a cylindrical support for a flat web of link mesh fabric, tools for forming and applying links successively to the edge of the fabric, automatically-operated means for shifting the support with a step by step movement to cause the links of each row to be successively added, and for advancing the fabric when each row of links has been completed, means for reversing the direction of movement after the last link of each row has been formed and applied, and means for throwing out of operation the said automatic shifting devices, leaving the support free to be moved by hand, whereby the fabric may be adjusted with reference to the link forming and applying means to enable a link to be formed and applied in any selected portion of the fabric.

20. In a machine for forming link or ring-mesh fabric, a support for the finished fabric mounted so as to be free to be moved by hand both in the direction of the length of the fabric and also transversely thereof, means for forming links and adding them to the fabric, and automatic power-driven means for shifting the support to control the progress of the work and to operate the link forming means, the said shifting means being disconnectible at pleasure to permit the fabric support to be free to be moved manually and the link-forming and adding means hand driven, whereby a link may be formed and applied to any selected portion of the fabric.

21. In a machine of the character described, a pin roller for supporting the link mesh fabric, link forming tools arranged upon opposite sides of that portion of the free end of the fabric extending from the pin roller, means for reciprocating said pin roller, and means for automatically imparting intermittent rotation to said pin roller.

22. In a machine of the character described, a support for a substantially flat vertically-disposed web of link mesh fabric, link forming tools, and edge guides for the side marginal links being formed.

23. In a machine of the character described, a support for a substantially flat web of link mesh fabric, link forming tools, and edge guides for the marginal links being formed, said edge guides comprising wires having free ends to permit the links to be drawn therefrom during progress of the work.

24. A machine of the character described including in its construction four shafts mounted in relative rectangular arrangement and having intermeshing bevel pinions, link forming tools within the rectangle, a support for a substantially flat web of link mesh fabric also within the rectangle, and means controlled by said shafts for actuating the said tools and shifting the said support.

25. A machine of the character described, comprising a rotary support having pins for engaging the links of fabric, means for shifting said pin-roll in the direction of its axis and also rotatively, and link-forming tools arranged upon opposite sides of the free end of the fabric extending from the said rotary support, for shaping links and interengaging them with previously formed links.

26. A machine of the character described comprising a rotatively mounted roll having pins to engage the links of the fabric, and from which a free end of the fabric extends, means for feeding and cutting off lengths of wire, tools for forming links from the cut-off pieces of wire and applying them to the said free end of the fabric, means for shifting the said roll in the direction of its axis, and means for intermittently rotating said roll.

27. A machine of the character described, comprising a support for a substantially flat web of link-mesh fabric, means for automatically shifting the web, means for feeding and severing a length of wire, a laterally movable bending pin for engaging and imparting a U-shape to the severed length of wire, and front and rear formers for converting the wire to circular form, said bending pin being movable to a plane below the plane of operation of said formers.

28. A machine of the character described, comprising a support for a substantially flat web of link mesh fabric, means for automatically shifting the web, formers movable toward and from each other on opposite sides of the plane of the web, a laterally movable pin for engaging and bending a piece of wire, means for shifting said pin to a position below the plane of operation of the formers, and means for feeding and severing a length of wire.

29. A machine of the character described comprising a support for a substantially flat web of link mesh fabric, means for shifting the support laterally, front and rear formers having recessed and grooved coöperating ends, a laterally movable pin for engaging and bending a length of wire toward one former, means for withdrawing said pin from operating position, and means for then bringing the two formers together to complete the shaping of the link.

30. In a machine for forming link mesh fabric, front and rear coöperating formers, means for engaging and shaping a length of wire in one of said formers, and a separate center former supporting the ends of the wire from the inside of the link as said ends are being closed together.

31. In a machine for forming link mesh fabric, front and rear coöperating formers, means for engaging and shaping a length of wire in one of said formers, and a center former supporting the ends of the wire from the inside of the link as said ends are being closed together, and means for removing said center former after the link has been formed.

32. In a machine of the character described, a support for a web of link mesh fabric, means for delivering pieces of wire from which links are to be formed, a bending pin, means for moving the pin to cause it to bend the wire, shaping members past which the pin carries the wire and coöperating therewith to cause the wire to be bent into U-shape as the pin is moved, means for withdrawing the pin, and tools for applying the U-shaped piece of wire to the fabric and completing the shaping thereof into a link.

33. A machine for forming link mesh fabric comprising front and rear formers having recessed and grooved coöperating ends, a laterally movable pin for engaging, bending and shaping a length of wire in one former, a center forming pin, and means for actuating said front and rear formers to bend the wire and form the link around said latter pin.

34. A machine of the character described comprising a support for a substantially flat web of link mesh fabric, means for shifting the support laterally, front and rear formers having recessed and grooved coöperating ends, means for bending and shaping a length of wire in one former, a center forming pin, and means for actuating said front and rear formers to bend the wire and form the link around said pin.

35. In a machine of the character described, reciprocating wire formers, means for feeding a length of wire to said formers and severing the same, a laterally movable bending pin for imparting a U-shape to the severed length of wire, a center forming pin, and means whereby said reciprocating formers will bend said wire length from the U-shape into a circular form around said forming pin.

36. In a machine of the character described, reciprocating wire formers, means for feeding a length of wire to said formers, means for severing the wire when fed, means for bending the wire into a U-shape in one of said formers, a center forming pin, means for passing said U-shape wire through a plurality of adjacent links in the fabric and bending the same into a circle around said forming pin, and means for withdrawing said forming pin when the link is formed.

37. In a machine of the character described, a support for a web of link mesh fabric, means for delivering U-shaped pieces of wire to link-forming tools, a center forming pin, tools for passing a U-shaped wire through adjacent links of the fabric and bending it into a link about the said forming pin, and means for withdrawing the said pin after the link has been formed.

38. A machine of the character described comprising a support for a substantially flat web of link mesh fabric, means for shifting the support laterally, front and rear formers having recessed and grooved coöperating ends, a laterally movable pin for bending a length of wire toward one former, means for withdrawing said pin out of operative position, a center former movable to and from position between the front and rear formers, and means for actuating the front and rear formers toward and from each other.

39. A machine of the character described comprising a support for a substantially flat web of link mesh fabric, means for shifting the support laterally, front and rear formers having recessed and grooved coöperating ends, a laterally movable pin for bending a length of wire toward one former into a U-shape, means for shifting said pin out of operative position, an intermediate guide for controlling the path of movement of the U-shaped loop through the adjacent links of the fabric and into the rear former, and means for actuating said formers to finish bending the loop into a circle.

40. In a machine of the character described, a support for a web of link mesh fabric, means for delivering U-shaped pieces of wire, tools for forming links from the said pieces of wire situated respectively on opposite sides of the fabric, means for bringing the tools together to form the links, and a guide for controlling the path of movement of the U-shaped piece of the wire and causing its legs to be passed through adjacent links of the fabric.

41. In a machine of the character described, a support for a web of link mesh fabric, means for delivering pieces of wire from which links are successively formed, means for bending the pieces of wire into U-shape, tools for forming the U-shaped pieces of wire and causing the ends thereof to be passed through links of the fabric to which they are to be united, and means for moving the said guide, arranged to cause it to be withdrawn while the shaping of the wire into U-form is taking place, and then brought into guiding position.

42. A machine of the character described comprising a support for a substantially flat web of link mesh fabric, means for shifting the support laterally, front and rear formers having recessed and grooved coöperating ends, a laterally movable pin for bending a length of wire toward one former into a U-shape, means for shifting said pin out of position, an intermediate guide for controlling the path of movement of the U-shaped loop through the adjacent links of the fabric and into the rear former, means for actuating said formers to finish bending the loop into a circle, and means for withdrawing said guide while the wire is being bent into the first loop form.

43. A machine of the character described, a support for a web of link mesh fabric, link forming tools, means for causing a relative movement of the tools and support during the progress of the work, and tipping devices arranged respectively on opposite sides of the web of fabric to position misplaced links to properly receive other links that are to be interengaged therewith.

44. In a machine of the character described, a support for a substantially flat web of link mesh fabric, a carriage on which said support is mounted, ratchet bars having means for reciprocating them, pawls carried by said carriage and engaging said ratchet bars, and means for controlling said pawls to permit but one of them at a time to act.

45. In a machine of the character described, a support for a substantially flat web of link mesh fabric, a carriage on which said support is mounted, ratchet bars having means for reciprocating them, pawls carried by said carriage and engaging said ratchet bars, and means for controlling said pawls to permit but one of them at a time to act, said means comprising a slide having cam surfaces to engage portions of the pawls to shift them alternately out of operative position.

46. In a machine of the character described, the combination of a support for a web of link mesh fabric, tools for successively forming and applying to the fabric links, an abutment which lies behind the links of the fabric to which a new link is being added, and means for moving the abutment out of the way after the link has been completed.

47. In a machine of the character described, a support for a web of link mesh fabric from which extends a free unsupported end of the fabric, tools for successively forming and applying to the fabric links, an abutment which lies behind the links of the fabric to which a new link is being added, and means for moving the abutment out of the way after the link has been completed.

48. In a machine of the character described, the combination of a support for a web of link mesh fabric, tools for successively forming and applying links to the fabric, a movable pin having one face curved to constitute a former about which the link is finally shaped, and another face constituting an abutment for those links of the fabric to which the new link is being added, and means for moving the said pin to inoperative position when a link is to be formed and removing it after the link has been completed.

49. In a machine of the character described, a support for a web of link mesh fabric from which extends a free unsupported end of the fabric, a movable pin having one face curved to constitute a former about which the link is finally shaped, and another face constituting an abutment for the links of the fabric to which the new link is being added, and means for moving the said pin into operative position when a link is to be formed and removing it after the link has been completed.

50. In a machine of the character described, the combination of a support for a web of a link mesh fabric, tools for successively applying links to the edge of said fabric, a pin about which the links are finally shaped, a movable slide which carries the said shaping pin, a device for tipping a misplaced link into proper position to receive another link, also carried by the said slide, and a cam device for operating the slide, arranged to move it to cause the shaping pin to be carried into position and there maintained while a link is being added to the fabric, and to then move it away from said position, and thereafter impart to the slide a quick movement to cause the tilting device to operate.

51. In a machine of the character described, a support for a substantially flat web of link mesh fabric, a carriage on which said support is mounted, ratchet bars having means for reciprocating them, pawls carried by said carriage and engaging said ratchet bars, and means for controlling said pawls to permit but one of them at a time to act, said means comprising a slide having cam surfaces to engage portions of the pawls to shift them alternately out of operative position, and means for automatically operating said slide.

52. In a machine of the character described, a carriage, means for reciprocating said carriage, a shaft having a roll for supporting the fabric, said shaft having ratchets, pawls adapted to actuate said ratchets, said pawls being spaced a distance greater than the distance between said ratchets whereby, as the carriage reciprocates, first one ratchet and then the other will be brought to position to be actuated by a pawl, and means for actuating said pawls.

53. In a machine of the character described, a support for a link mesh fabric, link forming tools, said support being movable laterally relatively to said tools, and an inclined strip adapted to be engaged by a misplaced link to turn the latter to proper position.

In testimony whereof we affix our signatures in presence of two witnesses.

HARRY W. SMITH.
CHARLES G. SMITH.

Witnesses:
HOWARD E. BARLOW,
E. I. OGDEN.